(12) United States Patent
Adamson et al.

(10) Patent No.: US 9,447,731 B1
(45) Date of Patent: Sep. 20, 2016

(54) SUPERSONIC ELLIPTICAL RAMP INLET

(75) Inventors: Eric E. Adamson, Newcastle, WA (US); Lawrence E. Fink, Renton, WA (US); Spencer R. Fugal, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 928 days.

(21) Appl. No.: 13/586,247

(22) Filed: Aug. 15, 2012

(51) Int. Cl.
*F02C 7/04* (2006.01)
*F02K 7/10* (2006.01)
*B64D 33/02* (2006.01)
*B64C 30/00* (2006.01)

(52) U.S. Cl.
CPC . *F02C 7/04* (2013.01); *F02K 7/10* (2013.01); *B64C 30/00* (2013.01); *B64D 33/02* (2013.01); *B64D 2033/026* (2013.01); *F05D 2250/14* (2013.01)

(58) Field of Classification Search
CPC  B64C 30/00; B64D 33/02; B64D 2033/026; F02C 7/04; F02K 7/10
See application file for complete search history.

(56) References Cited

U.S. PATENT DOCUMENTS

| | | | |
|---|---|---|---|
| 3,417,767 A * | 12/1968 | Young | 137/15.2 |
| 3,477,455 A * | 11/1969 | Campbell | 137/15.1 |
| 4,787,421 A * | 11/1988 | Yu | 138/178 |
| 5,881,758 A | 3/1999 | Koncsek et al. | |
| 6,575,406 B2 * | 6/2003 | Nelson | 244/119 |
| 6,793,175 B1 * | 9/2004 | Sanders et al. | 244/53 B |
| 7,631,836 B2 * | 12/2009 | Lebas | 244/53 B |
| 8,333,076 B2 * | 12/2012 | Conners et al. | 60/767 |

OTHER PUBLICATIONS

Patrick Cancro and H. Neale Kelly, Investigation of a ¼-scale Model of the Republic F-105 Airplane in the Langley 19-Foot Pressure Tunnel, NACA (National Advisory Committee for Aeronautics) RM SL54H27, Sep. 2, 1954, pp. 1-73.*
Welge et al., "N+2 Supersonic Concept Development and System Integration", NASA/CR-2010-216842, Aug. 2010, pp. 1-232.*
David L. Rodriguez, "Propulsion/Airframe Integration and Optimization on a Supersonic Business Jet", AIAA 2007-1048, 45th AIAA Aerospace Sciences Meeting and Exhibit, Jan. 8-11, 2007, pp. 1-11.*
Wikipedia Vought F-8 Crusader webpage internet archived on Nov. 14, 2010 (https://web.archive.org/web/20101114063654/http://en.wikipedia.org/wiki/Vought_F-8_Crusader).*
Vought F-8 Crusader blueprints (http://www.vought.org/photo/html/pimages/down/1532_020_22.gif) accessed on Jan. 5, 2015.*

* cited by examiner

*Primary Examiner* — Lorne Meade
(74) *Attorney, Agent, or Firm* — Patterson + Sheridan, LLP

(57) ABSTRACT

A supersonic inlet includes a supersonic section including a cowl which is at least partially elliptical, a ramp disposed within the cowl, and a flow inlet disposed between the cowl and the ramp. The ramp may also be at least partially elliptical.

20 Claims, 4 Drawing Sheets

SUPERSONIC ELLIPTICAL RAMP INLET

STATEMENT OF GOVERNMENT SUPPORT

This invention was made with government support under Contract No. NNL10AAOOT-N+2 Exp Val. awarded by NASA. The government has certain rights in the invention.

FIELD OF THE DISCLOSURE

The disclosure relates to supersonic inlets.

BACKGROUND OF THE DISCLOSURE

Existing 2-D supersonic inlets, such as in the F-15 and the F-14, for diffusing supersonic airflow to subsonic airflow entering an engine typically experience higher weight and drag than comparable axisymmetric supersonic inlets due to pressure loads on flat panels and overall larger surface area. They also may experience undesirable pressure distortion and inadequate total pressure recovery associated with the real flow physics of their corners. Bump inlet designs, such as in the F-22, may improve weight and drag, but often experience poor recoveries. Existing axisymmetric inlets, such as in the Mig-21, typically do not provide the same stability margins and tolerance to changes in the onset flow angle as 2-D supersonic inlets. Existing half-round inlets, such as in the Mirage III, often create integration issues for podded nacelle installations because the inlet aperture is wider than the engine cowl at the fan face. Typically, in the design of aircraft, one of the above-referenced designs is used which may add weight or reduce performance.

There is a need for a supersonic inlet which will improve upon one or more issues experienced by one or more of the existing supersonic inlets.

SUMMARY OF THE DISCLOSURE

In one embodiment, a supersonic inlet is disclosed. The supersonic inlet includes a supersonic compression section including a cowl which is at least partially elliptical, a ramp disposed within the cowl, and a flow inlet disposed between the cowl and the ramp.

In another embodiment, an aircraft is disclosed. The aircraft includes a supersonic inlet which includes a supersonic compression section attached to a subsonic diffusion section at a throat. The supersonic compression section includes a cowl which is at least partially elliptical, a first ramp disposed within the cowl, and a flow inlet disposed between the cowl and the first ramp. The subsonic diffusion section includes the cowl, a second ramp disposed within the cowl, and the flow inlet disposed between the cowl and the second ramp.

In still another embodiment, a method of diffusing supersonic airflow is disclosed. In one step, supersonic airflow is flowed into a flow inlet of a supersonic compression section. The flow inlet is disposed between a cowl, which is at least partially elliptical, and a ramp disposed within the cowl. In another step, the supersonic airflow is diffused as it flows through the flow inlet.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
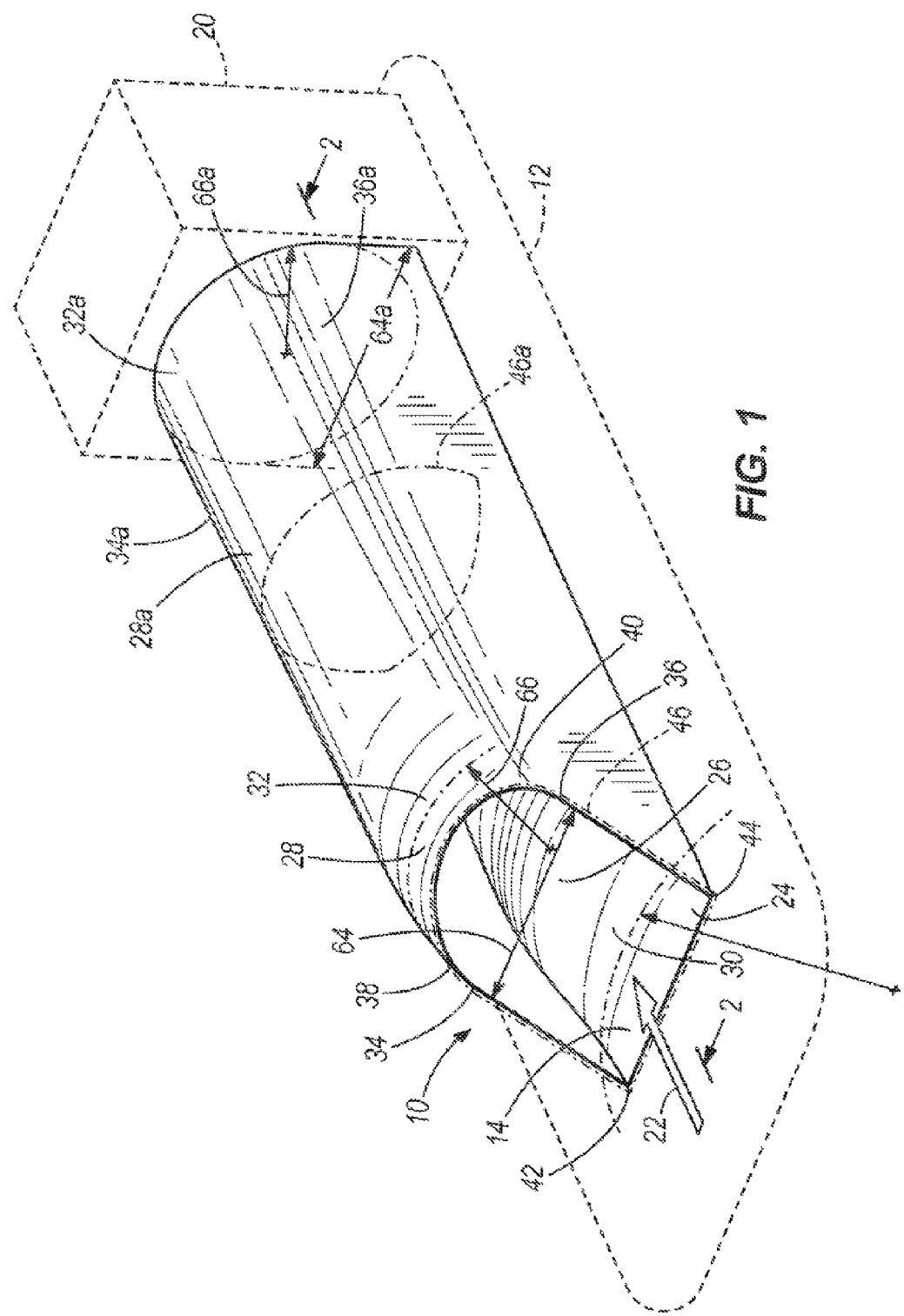
FIG. 1 illustrates a perspective view of one embodiment of a supersonic inlet.
Figure 2:
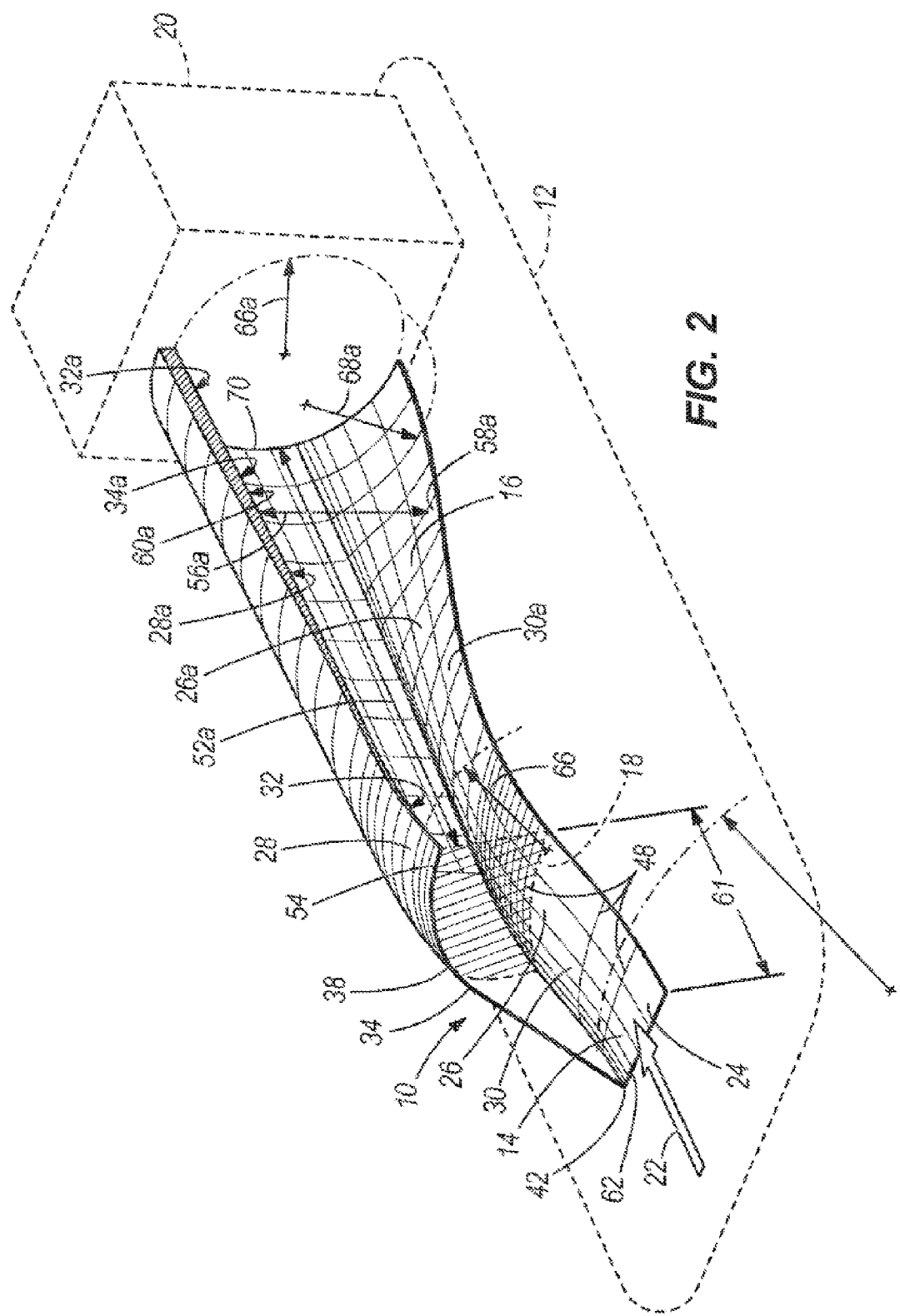
FIG. 2 illustrates a cross-section view through line 2-2 of FIG. 1.

FIG. 1 illustrates a perspective view of one embodiment of a supersonic inlet 10. FIG. 2 illustrates a cross-section view through line 2-2 of FIG. 1. The supersonic inlet 10 may comprise an external-compression supersonic inlet. In another embodiment the supersonic inlet 10 may comprise a mixed-compression supersonic inlet. The supersonic inlet 10 may comprise a portion of an aircraft 12. The supersonic inlet 10 is made of composite materials. In other embodiments, the supersonic inlet 10 may be made of other materials such as titanium, steel, aluminum, or other types of materials. As shown in FIG. 2, the supersonic inlet 10 comprises a supersonic compression section 14 attached to a subsonic diffusion section 16 at a throat 18. The subsonic diffusion section 16 is connected to an engine 20. The engine 20 comprises a gas turbine engine with a BPR (bypass ratio) value of 3.5, an OPR (overall pressure ratio) of 24, and a RIT (burner exit temperature) of 2900 degrees F. In other embodiments, the engine 20 may comprise a gas turbine engine with a range of BPR values of 1 to 16, OPR values of 14 to 80 and RIT values of 2,000 to 3,500 F, or a ramjet, ducted rocket, scramjet, or other type of air-breathing engine.

The supersonic compression section 14 is configured to diffuse a supersonic free stream airflow 22 as it flows from a beginning entrance 24 of the supersonic compression section 14, through a flow inlet 26 of the supersonic compression section 14, and to the throat 18 at which the subsonic diffusion section 16 begins. The supersonic compression section 14 comprises a cowl 28, a ramp 30 disposed within the cowl 28, and the flow inlet 26 disposed between the cowl 28 and the ramp 30. The cowl 28 is at least partially elliptical as viewed in the stream-wise direction comprising 50% of an ellipse. In another embodiment, the cowl 28 may comprise any percentage of an ellipse. The cowl 28 comprises a top surface 32, and side surfaces 34 and 36 attached to and extending between opposed portions 38 and 40 of the top surface 32 and opposed ends 42 and 44 of the ramp 30. The cowl 28 may form a U-shape. In other embodiments, the cowl 28 may comprise varying shapes.

The cowl 28 and the ramp 30 form a continuous perimeter 46 around the flow inlet 26. The top surface 32 is at least partially elliptical comprising 50% of an ellipse. In another embodiment, the top surface 32 may comprise any percentage of an ellipse. The side surfaces 34 and 36 are planar. In other embodiments, the side surface 34 and 36 may comprise any percentage of an ellipse. The ramp 30 comprises three turns 48 which are each configured to provide oblique shock waves in the supersonic airflow 22 as it flows through the flow inlet 26. In other embodiments, the ramp 30 comprises as few as two turns to as great as a continuous curved turn with each turn configured to provide oblique shock waves and compression in the supersonic airflow 22 as it flows through the flow inlet 26. The cross-section area (defined as the stream-wise cross-section area between the cowl 28 and the ramp 30) of the flow inlet 26 is smallest at the throat 18. In the preferred embodiment, the throat 18 is located at the entrance 24 of the supersonic inlet 10. The cross-section area increases aft of the throat 18. In another embodiment, the throat 18 is located aft of the cowl lip 54 within the supersonic inlet 10.

The general principle of the disclosure is not constrained by size. It is convenient to describe relative proportions with respect to the circular radius of curvature 66a (whose value is hereafter is called "R") at the interface to the engine 20. In the supersonic compression section 14, a length 61 of the ramp 30 from a ramp lip 62 to the throat 18 comprises 1.1 R. In other embodiments, in the supersonic compression section 14, the length 61 of the ramp 30 from the ramp lip 62 to the throat 18 may be in a range of 0.4 R to 5 R.

Figure 3:
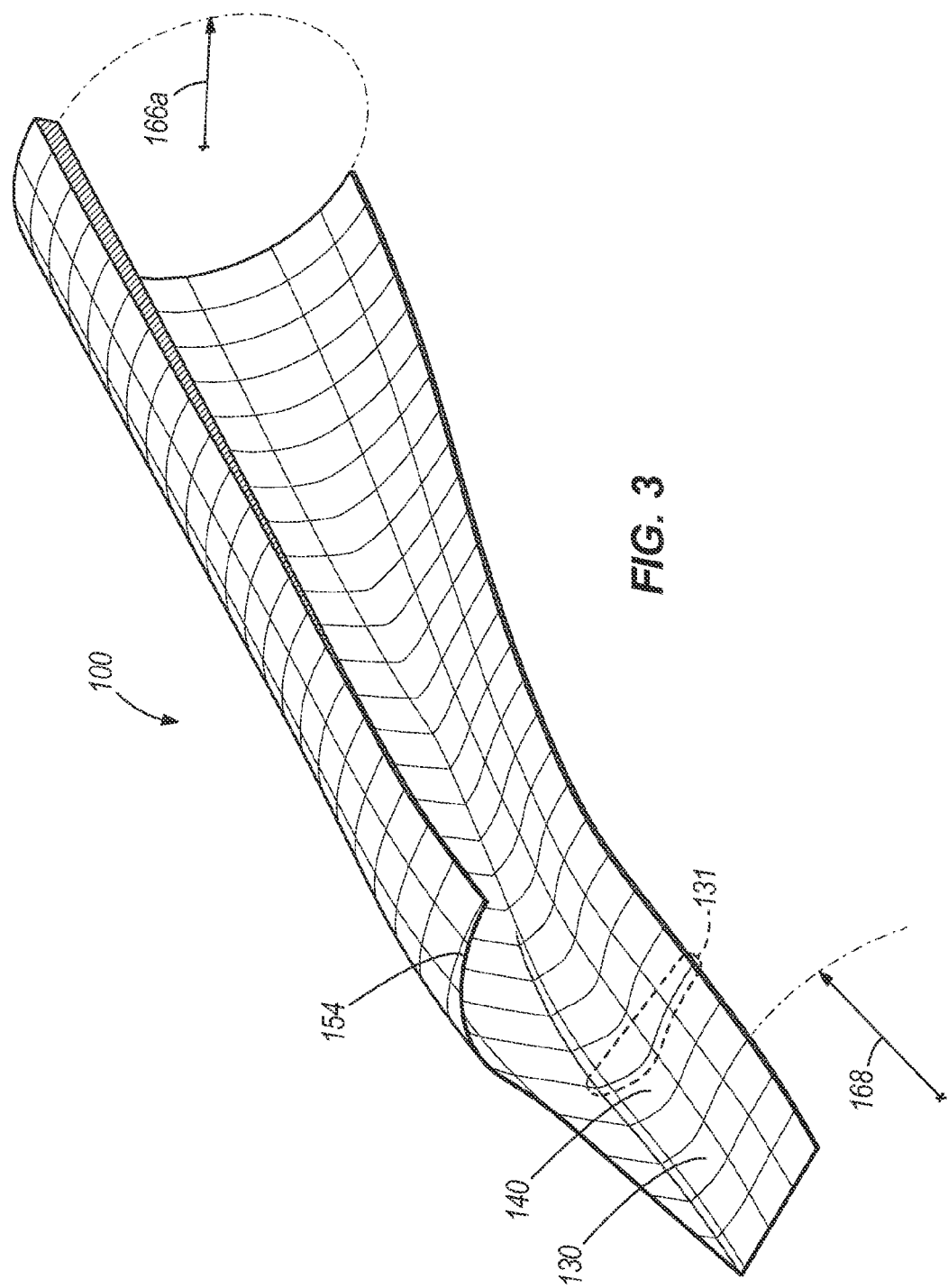
FIG. 3 illustrates a cross-section view through another embodiment of a supersonic inlet.

In the supersonic compression section 14, a width 64 between the side surfaces 34 and 36 of the cowl 28 is 2 R. In other embodiments, in the supersonic compression section 14, the width 64 between the side surfaces 34 and 36 of the cowl 28 may vary between 1 R and 3 R. In the supersonic compression section 14, the radius of curvature 66 of the top inside surface 32 of the cowl 28 follows that of an ellipse and is 1.3 R at the center and is 0.4 R where it meets the side surfaces 34 and 36. In other embodiments, in the supersonic compression section 14, the radius of curvature 66 of the top inside surface 32 of the cowl 28 may range between one-half the value of the opening width 64 to 2 R at the center and from 0.2 R to one-half the value of the opening width 64 where it meets the side surfaces 34 and 36. In the supersonic compression section 14, ramps 30 are each near-planar. FIG. 3 illustrates a cross-section view through another embodiment of a supersonic inlet 100. As shown in FIG. 3, in other embodiments, in the supersonic compression section 140, the radius of curvature 168 of the ramp 130 may range between infinite (straight) and 0.09 R (R being represented by 166a) in an undulating manner 131 to maximize total pressure recovery and minimize flow spillage at the cowl lip 154. Referring back to the embodiment of FIGS. 1 and 2, in the supersonic compression section 14, the throat 18 is located at the cowl lip 54. In other embodiments, in the supersonic compression section 14, the cross-section area of the flow inlet 26 between the cowl 28 and the ramp 30 may be up to 2 times the cross-section area at the throat 18 when the throat 18 is located within the inlet 10.

The subsonic diffusion section 16 is configured to receive the compressed airflow 22 from the supersonic compression section 14 and to further diffuse the airflow 22 in a subsonic condition prior to entering the engine 20. The subsonic diffusion section 16 comprises the cowl 28a, a second ramp 30a disposed within the cowl 28a, and the flow inlet 26a disposed between the cowl 28a and the second ramp 30a. The cowl 28a is at least partially elliptical in the subsonic diffusion section 16 comprising 50% of an ellipse. In other embodiments, the cowl 28a in the subsonic diffusion section 16 may be comprise any percentage of an ellipse, or may be in other non-elliptical shapes. The cowl 28a may form a U-shape in the subsonic diffusion section 16 with the top surface 32a being 50% of an ellipse and the side surfaces 34a and 36a being planar and attached to and extending between the top surface 32a and the second ramp 30a. In other embodiments, in the subsonic diffusion section 16, the top surface 32a and the side surfaces 34a and 36a may form any percentage of an ellipse.

The cowl 28a and the second ramp 30a form a continuous perimeter 46a around the flow inlet 26a. The second ramp 30a may be at least partially elliptical comprising 50% of an ellipse. In other embodiments, the second ramp 30a may comprise any percentage of an ellipse, or may be in varying shapes. In still other embodiments, the cowl 28a and the second ramp 30a may vary in shape. The cross-section area of the flow inlet 26a in the subsonic diffusion section 16 is smallest at the throat 18 and is largest at an end 70 of the subsonic diffusion section 16.

In the subsonic diffusion section 16, a length 52a of the cowl 28a from the throat 18 to an end 70 of the subsonic diffusion section 16 comprises 7.5 R. In other embodiments, in the subsonic diffusion section 16, the length 52a of the cowl 28a from the throat 18 to the end 70 of the subsonic diffusion section 16 may be in a range of 6.5 R to 8.5 R. In the subsonic diffusion section 16, a height distance 56a between a center 58a of the second ramp 30a and a center 60a of the top surface 32a of the cowl 28a may increase between 0.7 R at the throat 18 to 2 R at the end 70 of the subsonic diffusion section 16. In other embodiments, in the subsonic diffusion section 16, the height distance 56a between the center 58a of the second ramp 30a and the center 60a of the top surface 32a of the cowl 28a may vary between a range of 0.5 R to 1.0 R at the throat.

In the subsonic diffusion section 16, a width 64a between the side surfaces 34a and 36a of the cowl 28a is 1.8 R. In other embodiments, in the subsonic diffusion section 16, the width 64a between the side surfaces 34a and 36a of the cowl 28a may vary between 1.5 R to 2.5 R. In the subsonic diffusion section 16, the radius of curvature 66a of the inside top surface 32a of the cowl 28a is 1.R. In the subsonic diffusion section 16, the second ramp 30a is planar at the throat 18, and 1 R at the end 70. In other embodiments, in the subsonic diffusion section 16, the radius of curvature 68a of the second ramp 30a may range between infinite (straight) and 4 R. In the subsonic diffusion section 16, the cross-section area of the flow inlet 26a between the cowl 28a and the second ramp 30a at the throat 18 may be 40% of the cross-section area at the end 70 of the subsonic diffusion section 16. In other embodiments, in the subsonic diffusion section 16, the cross-section area of the flow inlet 26a between the cowl 28a and the second ramp 30a at the throat 18 may vary from 20% to 60% of the cross-section area at the end 70 of the subsonic diffusion section 16.

The elliptical configuration of the supersonic inlet 10 provides many benefits over one or more of the existing supersonic inlets such as providing high performance, providing high efficiency, providing low distortion, providing high recovery, providing low external drag, and being of low weight allowing for a reduction in size of the aircraft 12 or an increase in range of the aircraft 12 over one or more existing aircraft which utilize one or more of the existing supersonic inlets. The speed of the airflow 22 ranges from Mach 1.66 at the cowl lip 54 of the supersonic compression section 14 to Mach 1.158 at the throat 18 to Mach 0.5 at the end 70 of subsonic diffusion section 16. In other embodiments, the speed of the airflow 22 may range from Mach 1.4 to 4.0 at the cowl lip 54 of the supersonic compression section 14 to Mach 1.1 to 1.5 at the throat 18 to Mach 0.3 to 0.6 at the end 70 of subsonic diffusion section 16. The resultant on design pressure recovery at the end 70 of subsonic diffusion section is 0.973. In other embodiments, the pressure recovery may range from to 0.12 to 0.98.

The airflow 22 uniformly flows in the cross-section area of the supersonic compression section 14, in the cross-section area of the subsonic diffusion section 16, and remains near-uniform at the end 70 of subsonic diffusion section 16 with a low distortion of 0.0389 [(maximum−minimum total pressure)/average total pressure]. In other embodiments, the low distortion in the cross-section area of the subsonic diffusion section 16 may range between 0.02 to 0.10.

The supersonic inlet 10 provides a low external drag of due to the reduction in external surface area of the supersonic inlet 10. Use of the supersonic inlet 10 allows for a 5% improvement in range of the aircraft 12. In other embodiments, use of the supersonic inlet 10 may allow for a range of 1% to 12% improvement in range of the aircraft 12.

Figure 4:
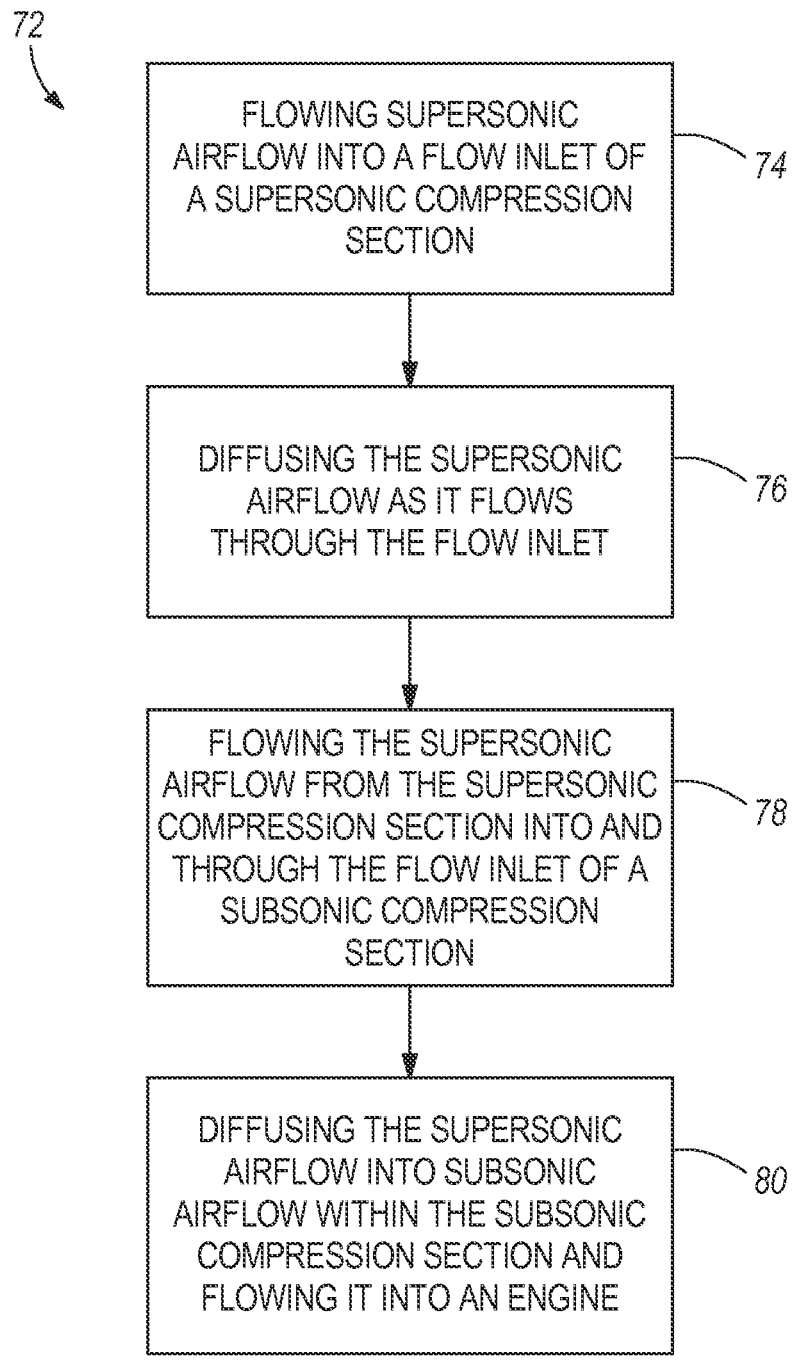
FIG. 4 is a flowchart of one embodiment of a method of compressing and diffusing supersonic airflow.

FIG. 4 is a flowchart of one embodiment of a method 72 of compressing and diffusing supersonic airflow. The method may utilize any of the supersonic inlets 10 disclosed herein. In step 74, supersonic airflow is flowed into a flow inlet of a supersonic compression section. The supersonic compression section may comprise any of the embodiments disclosed herein. The flow inlet of the supersonic compression section is disposed between a cowl, which is at least partially elliptical, and a ramp disposed within the cowl. The ramp may be at least partially elliptical. In other embodiments, the ramp may vary in shape.

In step 76, the supersonic airflow is diffused as it flows through the flow inlet. In the supersonic compression section, a cross-section of the flow inlet through which the supersonic airflow flows may be largest at a beginning entrance of the supersonic compression section and may be smallest at a throat at an end of the supersonic compression section. The supersonic airflow may flow over 2 to 10 turns of the ramp as it flows through the supersonic compression section with each turn providing a shock to the supersonic airflow. The supersonic airflow may be externally compressed as it flows through the flow inlet.

In step 78, the supersonic airflow flows from the supersonic compression section into and through the flow inlet of the subsonic diffusion section. In step 80, the supersonic airflow is diffused into subsonic airflow within the subsonic diffusion section and subsequently flows into an engine. The subsonic diffusion section may comprise the elliptical cowl, and a second ramp which may be elliptical, with the flow inlet being disposed between the elliptical cowl and the second ramp. In the subsonic diffusion section, a cross-section of the flow inlet through which the supersonic airflow flows may be smallest at the throat at the beginning of the subsonic diffusion section and may be largest at an end of the subsonic diffusion section. In other embodiments, the subsonic diffusion section may comprise any of the embodiments disclosed herein. In still other embodiments, one or more of the steps of the method may be varied in order, varied all-together, not followed, or additional steps may be added.

It should be understood, of course, that the foregoing relates to exemplary embodiments of the disclosure, and that modification may be made without departing from the spirit and scope of the disclosure as set forth in the following claims.

We claim:

1. A supersonic inlet comprising:
 a supersonic compression section comprising a cowl and a ramp;
 wherein the cowl includes a cowl lip and sides extending from the cowl lip, wherein the cowl lip includes an at least partially elliptical cross-sectional profile as viewed in a first direction along a free stream airflow that is perpendicular to a ramp lip, and wherein the sides are straight between the cowl lip and the ramp lip; and
 wherein the ramp extends from the ramp lip at an upstream end to at least a throat in the first direction, wherein a flow inlet is an opening between the cowl and the ramp, and the throat is arranged in the flow inlet, wherein the ramp extends between the sides of the cowl in a second direction perpendicular to the first direction, wherein the ramp includes a surface that undulates when traversing the surface from a first point on the ramp along the second direction toward the straight sides of the cowl, such that the surface is convex from the first point on the ramp to second points on the ramp and concave from the second point to the sides, and such that the concave surfaces blend into the straight sides of the cowl.

2. The supersonic inlet of claim 1 wherein the cowl and the ramp form a continuous perimeter around the flow inlet.

3. The supersonic inlet of claim 1 wherein the sides are planar.

4. The supersonic inlet of claim 1 wherein the cowl is U-shaped.

5. The supersonic inlet of claim 1 wherein the supersonic inlet comprises an external-compression supersonic inlet.

6. The supersonic inlet of claim 1 wherein the supersonic inlet comprises a mixed-compression supersonic inlet.

7. The supersonic inlet of claim 1 wherein the ramp comprises two or more turns along the first direction each configured to provide a shock to supersonic air flow flowing through the flow inlet.

8. The supersonic inlet of claim 1 further comprising a subsonic diffusion section attached to the supersonic compression section at a throat, wherein in the supersonic compression section a cross-section of the flow inlet is largest at a beginning entrance of the supersonic inlet and is smallest at the throat, and in the subsonic diffusion section the cross-section of the flow inlet is smallest at the throat and largest at an end of the subsonic diffusion section.

9. The supersonic inlet of claim 8 wherein the subsonic diffusion section is also at least partially elliptical.

10. The supersonic inlet of claim 9 wherein the subsonic diffusion section comprises the cowl and a second ramp disposed within the cowl.

11. The supersonic inlet of claim 10 wherein in the subsonic diffusion section the cowl is at least partially elliptical.

12. The supersonic inlet of claim 1 wherein the supersonic inlet comprises a portion of an aircraft.

13. An aircraft comprising:
 a supersonic inlet comprising a supersonic compression section attached to a subsonic diffusion section at a throat;
 wherein the supersonic compression section comprises:
  a cowl and a first ramp;
   wherein the cowl includes a cowl lip and sides extending from the cowl lip, wherein the cowl lip includes an at least partially elliptical cross-sectional profile as viewed in a first direction along a free stream airflow that is perpendicular to a ramp lip, and wherein the sides are straight between the cowl lip and the ramp lip;
   wherein the first ramp extends from the ramp lip at an upstream end to at least a throat in the first direction, wherein a flow inlet is an opening between the cowl and the first ramp, and the throat is arranged in the flow inlet, wherein the first ramp extends between the sides of the cowl in a second direction perpendicular to the first direction, wherein the first ramp includes a surface that undulates when traversing the surface from a first point on the first ramp along the second direction toward the sides of the cowl, such that the surface is convex from the first point on the first ramp to second points on the first ramp and concave from the second points to the sides such that the concave surfaces blend into the straight sides of the cowl; and wherein the subsonic diffusion section comprises:
the cowl;
a second ramp disposed within the cowl; and
the flow inlet disposed between the cowl and the second ramp.

14. The aircraft of claim 13 wherein the subsonic diffusion section is at least partially elliptical.

15. The aircraft of claim 13, wherein the first ramp comprises two or more turns each configured to provide a shock to supersonic air flow flowing through the flow inlet.

16. A method of diffusing supersonic airflow comprising:
flowing supersonic airflow into a flow inlet of a supersonic compression section, the flow inlet disposed between a cowl and a ramp of the supersonic compression section, wherein the cowl includes a cowl lip and sides extending from the cowl lip, wherein the cowl lip includes an at least partially elliptical cross-sectional profile as viewed in a first direction along a free stream airflow that is perpendicular to a ramp lip, and wherein the sides are straight between the cowl lip and the ramp lip, and wherein the ramp extends from the ramp lip at an upstream end to at least a throat in the first direction, wherein the throat is arranged in the flow inlet, wherein the ramp extends between the sides of the cowl in a second direction perpendicular to the first direction, wherein the ramp includes a surface that undulates when traversing the surface from a first point on the ramp along the second direction toward sides of the cowl, such that the surface is convex from the first point on the ramp to second points on the ramp and concave from the second points to the sides, and such that the concave surfaces blend into the straight side surfaces of the cowl; and diffusing the supersonic airflow as it flows through the flow inlet.

17. The method of claim 16 further comprising flowing the supersonic airflow through a cross-section of the flow inlet which is largest at a beginning entrance of the supersonic compression section and which is smallest at a throat at an end of the supersonic compression section.

18. The method of claim 16 further comprising flowing the supersonic airflow over two or more turns of the ramp along the first direction, with each turn providing a shock to the supersonic air flow.

19. The method of claim 16 further comprising externally compressing the supersonic airflow as it flows through the flow inlet.

20. The method of claim 16 further comprising flowing the supersonic airflow from the supersonic compression section into and through a subsonic diffusion section, and diffusing the supersonic airflow into subsonic airflow within the subsonic diffusion section.

* * * * *

UNITED STATES PATENT AND TRADEMARK OFFICE
CERTIFICATE OF CORRECTION

PATENT NO.      : 9,447,731 B1
APPLICATION NO. : 13/586247
DATED           : September 20, 2016
INVENTOR(S)     : Eric E. Adamson et al.

Page 1 of 1

It is certified that error appears in the above-identified patent and that said Letters Patent is hereby corrected as shown below:

Specification

In column 1, line 6, delete "NNL10AAOOT-N+2" and insert -- NNL10AA00T-N+2 --, therefor.

Signed and Sealed this
Thirteenth Day of December, 2016

Michelle K. Lee
*Director of the United States Patent and Trademark Office*